United States Patent Office 2,822,408
Patented Feb. 4, 1958

2,822,408

CHLORINATION OF 1,1,1,3-TETRACHLORO-2-METHYL-2-ALKANOLS WITH SULFURYL CHLORIDE

Donald G. Kundiger, Manhattan, Kans., and Elwin B. W. Ovist, Park Forest, Ill., assignors to The Dow Chemical Company, Midland, Mich., a corporation of Delaware No Drawing. Application August 6, 1956
Serial No. 602,415

5 Claims. (Cl. 260—633)

This invention relates to a chlorination process and is particularly directed to a method for the chlorination of tertiary trichloromethyl-carbinols.

It has been shown, for example, in the article by H. C. Brown, Industrial and Engineering Chemistry, vol. 36, pages 785–791 (1944), that a variety of organic compounds containing aliphatic chains, including acyclic hydrocarbons, alkyl halides, aliphatic ketones, aliphatic carboxylic acids and aliphatic carboxylic acid halides may be chlorinated by employing sulfuryl chloride in the presence of an organic peroxide. The prior art, however, indicates that such a chlorination method is not available with alcohols since the latter are shown to react according to the following equation $$ROH + SO_2Cl_2 \rightarrow ROSO_2Cl$$ 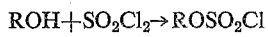

to produce alkyl chlorosulfonate esters.

It is an object of the present invention to provide a method for chlorinating tertiary trichloromethyl-carbinols. It is a further object to provide a method for chlorinating such carbinols wherein chlorine is substituted predominantly on a carbon adjacent to the carbon attached to the hydroxyl group. Other objects will become apparent from the following specification and claims.

In accordance with the present invention, it has been discovered that with certain tertiary trichloromethyl-carbinols, namely 1,1,1-trichloro-2-methyl-2-alkanols, chlorination can be accomplished by the use of sulfuryl chloride in the presence of an organic agent capable of yielding free radicals. It is among the advantages of the invention that the reaction, as herein set forth, produces chiefly products containing only one more chlorine atom than the starting materials and having such additional chlorine atom on a carbon adjacent to the carbon attached to the hydroxyl group. Thus, the invention embodies a method for the preparation of 1,1,1,3-tetrachloro-2-methyl-2-alkanols.

The tertiary trichloromethyl-carbinols which may be chlorinated in accordance with the present invention are 1,1,1-trichloro-2-methyl-2-alkanols containing from 4 to 11 carbon atoms and have the formula

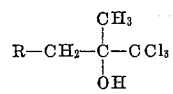
$$\text{R—CH}_2\text{—}\underset{\underset{\text{OH}}{|}}{\overset{\overset{\text{CH}_3}{|}}{\text{C}}}\text{—CCl}_3$$

wherein R represents hydrogen or an alkyl group containing from 1 to 7 carbon atoms, inclusive. In the practice of the invention, 1 molar proportion of a trichloromethyl-carbinol as set forth above is reacted with an approximately equimolar proportion of sulfuryl chloride in the presence of a catalytic amount of an agent capable of yielding free radicals such as an alkyl or acyl peroxide or an azo-dialiphatic compound. Good results are obtained when from 0.9 to 1.1 moles of the sulfuryl chloride are employed per mole of carbinol. The reaction is initiated readily when the reactants and the catalyst are contacted at temperatures of from about 50° to about 120° C. and proceeds with the evolution of gaseous sulfur dioxide and hydrogen chloride.

In practice, it is sometimes convenient to carry out the reaction in an inert solvent. In general, such solvents should be incapable of being chlorinated under the conditions of the reaction. Suitable solvents include chlorinated hydrocarbons such as carbon tetrachloride and perchloroethylene. When employing a reaction solvent it is convenient to carry out the reaction at the boiling temperature of the solvent and under reflux.

The reaction is somewhat exothermic and the rate of reaction increases with increasing temperature. Desirable rates can be maintained by controlling the temperature and/or the rate of admixing of the reactants. Good results have been obtained when adding about 1 gram mole of sulfuryl chloride to 1 gram mole of tertiary trichloromethyl-carbinol during a period of from about 2 to 4 hours while maintaining the reaction mixture at temperatures of from 70° to 80° C. Following the admixture of the reactants, the reaction mixture is maintained at a reaction temperature for a period of time to accomplish completion of the chlorination. Thereafter, the desired products are recovered by conventional procedures such as washing, extraction and fractional distillation.

Suitable agents capable of yielding free radicals for catalyzing the reaction are agents yielding free radicals when heated at temperatures of from about 50° to 120° C. Such free radical initiating agents include dialkyl peroxides such as di-tertiarybutyl peroxide, acyl peroxides such as benzoyl peroxide and azo-dialiphatic compounds such as α,α'-azo-diisobutyronitrile. The amount of such agent to be employed will vary depending upon such factors as the reaction temperature and the particular agent used. In any case, at least a catalytic amount is employed. Good results have been obtained when using from about 0.005 to about 0.06 mole of free radical initiating agent per mole of trichloromethyl-carbinol in the reaction. With agents which break down slowly to yield free radicals over an extended period of time, the entire amount of such agent required may be introduced into the reaction mixture at the time of initiating reaction. In general, however, it is desirable to introduce the free radical initiating agent in 2 or more increments during the course of the reaction.

The reaction proceeds satisfactorily at ordinary pressures. It is sometimes convenient, however, to carry out the reaction under reduced pressure to assist in removing by-product sulfur dioxide and hydrogen chloride from the reaction zone. Ordinary chemical apparatus is suitable provided the materials of such apparatus are resistant to attack by the reactants and the acidic by-products formed.

The following examples illustrate the invention but are not to be construed as limiting the same.

*Example 1*

3 grams of benzoyl peroxide was dissolved in a solution of 67 grams (0.35 mole) of 1,1,1-trichloro-2-methyl-2-butanol in 250 milliliters of dry carbon tetrachloride at the reflux temperature of 75°–80° C. To the resulting mixture 47.5 grams (0.35 mole) of sulfuryl chloride was added portion-wise with stirring. Following the addition of the sulfuryl chloride, an additional 2 grams of benzoyl peroxide was added and the reaction mixture maintained at reflux temperature for five hours. Thereafter, the solvent was recovered by distillation and the crude product fractionally distilled under reduced pressure to obtain a 1,1,1,3-tetrachloro-2-methyl-2-butanol product boiling at 63° C. under 0.7 millimeter pressure and having a density (20°/4° C.) of 1.443. Infrared spectra and mass spectra analyses of the product confirmed the assigned structure.

Example 2

Following the procedure of Example 1, 54 grams (0.22 mole) of 1,1,1-trichloro-2-methyl-2-octanol (boiling at 137°–140° C. under 19 millimeters pressure), 5 grams of benzoyl peroxide and 29.7 grams (0.22 mole) of sulfuryl chloride were mixed together in 250 milliliters of carbon tetrachloride and heated at temperatures of 79° to 80° C. and under reflux for five hours. Fractional distillation of the crude reaction product yielded a 1,1,1,3-tetrachloro-2-methyl-2-octanol product, boiling at 127°–132° C. under 1.2 millimeters pressure and having a refractive index ($n/D$) of 1.501 at 20° C. and a density (20°/4° C.) of 1.288.

Example 3

178 grams (1 mole) of 1,1,1-trichloro-2-methyl-2-propanol was dissolved in 500 milliliters of carbon tetrachloride and the mixture heated at reflux temperature. 5 grams of benzoyl peroxide was dispersed in the mixture and thereafter 149 grams (1.1 mole) of sulfuryl chloride added portionwise thereto with stirring. On completion of the addition of sulfuryl chloride, a further 5 grams of benzoyl peroxide was added and the mixture maintained under reflux for about six hours. Thereafter, the crude product was distilled as in the preceding examples to obtain a 1,1,1,3-tetrachloro-2-methyl-2-propanol boiling at 99° C. under 14 millimeters pressure and having a refractive index ($n/D$) of 1.514 at 20° C. and a density (20°/4° C.) of 1.59.

Example 4

356 grams (2 moles) of 1,1,1-trichloro-2-methyl-2-propanol, 284 grams (2.1 moles) of sulfuryl chloride and 1 gram of $\alpha,\alpha'$-azo-diisobutyronitrile were dissolved in 500 milliliters of dry carbon tetrachloride and the mixture heated at about 76° C. under reflux. At one hour intervals thereafter, second and third 1-gram portions of the azo-diisobutyronitrile free radical initiator were introduced into the reaction mixture. The latter was maintained at temperatures of 70°–80° C. under reflux for a total of eight hours and then fractionally distilled as in the preceding examples to obtain the desired 1,1,1,3-tetrachloro-2-methyl-2-propanol product.

The tertiary trichloromethyl-carbinols employed as starting materials may be prepared by admixing at least 2 molar proportions of a ketone of the formula

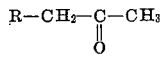

wherein R has the aforementioned significance with 1 molar proportion of chloroform and adding thereto, portionwise, 1 molar proportion of finely powdered potassium hydroxide while maintaining the temperature at from about 0° to −5° C. On completion of the reaction, the desired trichloromethylcarbinol and unreacted starting materials are separated and recovered by washing with water, extraction and fractional distillation.

We claim:

1. A method for the preparation of 1,1,1,3-tetrachloro-2-methyl-2-alkanols which comprises reacting a 1,1,1-trichloro-2-methyl-2-alkanol of the formula

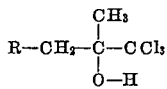

wherein R is selected from the group consisting of hydrogen and alkyl radicals containing from 1 to 7 carbon atoms, with sulfuryl chloride in the presence of a catalytic amount of a free radical initiator.

2. A method according to claim 1 wherein the free radical initiator is benzoyl peroxide.

3. A method according to claim 1 wherein the reaction is carried out at temperatures of from about 50° to about 120° C.

4. A method according to claim 1 wherein the sulfuryl chloride is employed in the proportions of from about 0.9 to 1.1 moles per mole of trichloromethyl alkanol in the reaction.

5. A method for the preparation of 1,1,1,3-tetrachloro-2-methyl-2-alkanols which comprises reacting one molar proportion of a 1,1,1-trichloro-2-methyl-2-alkanol containing from 4 to 11 carbon atoms with from about 0.9 to 1.1 molar proportions of sulfuryl chloride in the presence of from about 0.005 to 0.06 molar proportions of benzoyl peroxide and at a temperature of from about 50° to about 120° C.

References Cited in the file of this patent

UNITED STATES PATENTS 2,302,228   Kharasch et al. _____ Nov. 17, 1942

FOREIGN PATENTS 177,416   Austria _____ Jan. 25, 1954

OTHER REFERENCES

Royals: "Advanced Organic Chemistry," Prentice-Hall, Englewood Cliffs, N. J., 1954; pp. 159–60.